United States Patent
Azar et al.

(10) Patent No.: US 12,308,699 B2
(45) Date of Patent: May 20, 2025

(54) ELECTRICAL MACHINE, STATOR EXTENSION ELEMENT AND WIND TURBINE

(71) Applicant: Siemens Gamesa Renewable Energy A/S, Brande (DK)

(72) Inventors: Ziad Azar, Sheffield (GB); Richard Clark, Sheffield (GB); Thomas Tøttrup Jensen, Brande (DK); Subhra Samanta, Ikast (DK); Arwyn Thomas, Breaston (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 120 days.

(21) Appl. No.: 17/735,174

(22) Filed: May 3, 2022

(65) Prior Publication Data

US 2022/0360123 A1    Nov. 10, 2022

(30) Foreign Application Priority Data

May 6, 2021 (EP) ..................... 21172369

(51) Int. Cl.
*H02K 1/16*    (2006.01)
*H02K 3/12*    (2006.01)
*H02K 7/18*    (2006.01)

(52) U.S. Cl.
CPC .............. *H02K 1/16* (2013.01); *H02K 3/12* (2013.01); *H02K 7/183* (2013.01)

(58) Field of Classification Search
CPC ............. H04R 1/16; H04R 3/12; H04R 7/183
See application file for complete search history.

(56) References Cited

U.S. PATENT DOCUMENTS

| 6,229,241 B1 * | 5/2001 | Ishigami | .............. H02K 15/045 |
| | | | 310/216.069 |
| 8,174,160 B2 | 5/2012 | Stiesdal | |
| 9,276,446 B2 * | 3/2016 | Schönbauer | ............. H02K 3/04 |

(Continued)

FOREIGN PATENT DOCUMENTS

| CN | 207234538 U | 4/2018 |
| CN | 110829631 A | 2/2020 |

(Continued)

OTHER PUBLICATIONS

English translation of EP-3309933-A1, accessed Mar. 6, 2024 via Espacenet, <https://translationportal.epo.org/emtp/translate/?ACTION=description-retrieval&COUNTRY=EP&ENGINE=google&FORMAT=docdb&KIND=A1&LOCALE=en_EP&NUMBER=3309933&SRCLANG=de&TRGLANG=en> (Year: 2018).*

(Continued)

*Primary Examiner* — Jeremy A Luks
(74) *Attorney, Agent, or Firm* — Schmeiser, Olsen & Watts LLP (57) ABSTRACT

An electrical machine is provided including a stator with a stator core, a plurality of stator teeth protruding radially from the stator core, and a plurality of stator coils, wherein each stator coil is wound around at least one stator tooth of the stator and includes at least one coil head protruding in axial direction beyond the stator core, wherein the stator includes a stator extension structure with a plurality of magnetic flux-guiding extension segments each protruding axially from a stator tooth into an area surrounded by at least one of the coil heads.

16 Claims, 4 Drawing Sheets

(56) References Cited

U.S. PATENT DOCUMENTS

| | | |
|---|---|---|
| 2012/0112570 A1 | 5/2012 | Le Besnerais |
| 2016/0072343 A1 | 3/2016 | Köhler et al. |
| 2019/0280546 A1* | 9/2019 | Soerensen ................ F03D 9/25 |
| 2020/0248704 A1 | 8/2020 | Bäuerle et al. |
| 2021/0091608 A1 | 3/2021 | Hull |

FOREIGN PATENT DOCUMENTS

| | | | | |
|---|---|---|---|---|
| EP | 3309933 A1 * | 4/2018 | ............... | H02K 1/02 |
| WO | WO 2015000915 A2 | 1/2015 | | |

OTHER PUBLICATIONS

European Search Report issued on Oct. 22, 2021 for application No. 21172369.7.

* cited by examiner

ELECTRICAL MACHINE, STATOR EXTENSION ELEMENT AND WIND TURBINE

CROSS-REFERENCE TO RELATED APPLICATIONS

This application claims priority to EP Application No. 21172369.7, having a filing date of May 6, 2021, the entire contents of which are hereby incorporated by reference.

FIELD OF TECHNOLOGY

The following relates to an electrical machine comprising a stator with a stator core, a plurality of stator teeth protruding radially from the stator core, and a plurality of stator coils, wherein each stator coil is wound around at least one stator tooth of the stator and comprises at least one coil head protruding in axial direction beyond the stator core. Furthermore, the following relates to a stator extension element and a wind turbine.

BACKGROUND

The coil heads of stator coil windings, which protrude from the stator core, are excited during the operation of the electrical machine and carry an electrical current. However, they may be regarded as passive portions of the stator winding, since they are not active in producing torque or electromotive force. In an electric machine used as a generator, the alternating magnetic field is nearly entirely guided through the stator core, so that the coil heads protruding from the stator core are not involved in the generation of induced electromotive force or torque. Therefore, the coil heads may be regarded as passive electrical conductors, which do not contribute to the creation of torque and induced electromotive force in an electrical motor, or an electrical generator, respectively.

In addition, since the coil heads are not in a direct contact with the stator core, they may have the highest temperatures of the parts of the electric machine. Therefore, the electrical conductor portions of the stator windings forming the coil heads contribute mainly to the losses in the electrical machine and decrease the efficiency of the electrical machine.

It is therefore desired that the portions of the conductors forming the coil heads are as short as possible. This may be achieved for instance by the winding scheme or the winding pattern, in which the stator winding is wound around the stator teeth of the stator. However, since the stator windings are guided through the slots between neighboring stator teeth, a certain coil head portion is required to bridge at least the circumferential distance between two adjacent slots at the front faces of the stator. Since the coil heads are inevitably, it is desirable that the losses induced by the coil heads are reduced as much as possible.

SUMMARY

An aspect relates to an electrical machine with an increased efficiency.

This aspect is solved by an electrical machine as initially described, wherein the stator comprises a stator extension structure with a plurality of magnetic flux-guiding extension segments each protruding axially from a stator tooth into an area surrounded by at least one of the coil heads.

The stator of the electrical machine comprises a stator winding which is formed by a plurality of stator coils. A portion of each stator coil extends straight or essentially straight in axial direction through the stator slots between the stator teeth that protrude radially form the stator core of the stator. At one or more of the front faces of the stator, the winding is guided from one slot between two adjacent stator teeth into another slot between two stator teeth by a coil head portion of the stator coil. The coil head protrudes in axial direction beyond the stator core and bridges the circumferential distance between the two straight sections of the stator coil.

The stator comprises a stator extension structure with a plurality of stator extension segments. The stator extension structure and in particular the stator extension segments protrude in axial direction beyond the stator core, or beyond one of the axially separated end faces of the stator, respectively. The stator extension segments each protrude in axial direction from one of the stator teeth into the area which is surrounded by at least one of the coil heads. In other words, the stator core is extended by the magnetic flux-guiding extension segments into the area that is at least partly surrounded by one or more of the coil heads.

This has the advantage that the coil heads become active parts of the electrical machine. Due to the extension of the stator core into the area of the coil heads, also the coil heads can be considered as part of the active length of the stator and provide additional contribution to the generation of an induced voltage or an induced electromotive force (EMF) and torque. The extension segments project from the stator core between axially straight sections and/or into one or more bent portions of at least some of the coil heads, i.e., into the portion of the stator coil which protrudes beyond the stator core. In particular, at least one stator extension segment protrudes into each of the areas surrounded at least partly from coil heads of the stator winding. The stator extension segments may have a radial length equal to the radial extent of the stator coils or they may be slightly larger or shorter than the radial extent of the stator coils. In an embodiment, at least the area surrounded at least partly by one or more of the coil heads is in radial direction filled with the material of one of the flux-guiding extension segments.

By the extension structure of the stator core, the efficiency of the electric machine can be increased since also the coil head portions of the stator coils are involved in the generation of an electric power and torque. Therefore, also the coil heads, or the stator core end region, respectively, may be used to produce torque by increasing the permeability in the areas surrounded by the coil heads due to the extension structure of the stator core. By the extension segments, which are in particular soft magnetic and/or which have a permeability higher than air, the magnetic flux can be conducted in the area at least partly enclosed by the coil heads in particular in the same manner as by the stator core and/or the stator teeth.

This allows for increasing the ratio between power and density of the electrical machine. When the electrical machine is used for instance as a generator in a wind turbine, the costs of the energy production may be reduced by increasing the amount of energy generated correspondingly, it is possible that for providing a predetermined power, the length of the stator in axial direction and therefore also the length of the stator windings may be reduced so that also the need for material for the stator core and/or the windings may be reduced. Furthermore, the extension structure may be used for at least partly supporting the coil heads. This may increase the mechanical stability of the stator winding. In addition to that, the extension structure may improve the thermal conduction of heat losses from the coil heads to the stator core. This reduces the temperature of the coil heads, which form local temperature hotspots of the electrical machine.

In an embodiment, at least some of the extension segments extend at least partly into an area which is surrounded by a radially and/or circumferentially bent portion of at least one of the coil heads. The extension segments protrude from the stator teeth, which are arranged between the straight sections of the stator coil, into the area surrounded at least partly by the radially and/or circumferentially bent portion of the coil head.

Depending on the winding scheme of the stator coils, each coil head has a circumferentially and/or a radially bent portion. It is possible that a coil head comprises one or more portions which are both radially and circumferentially bent. Additionally, or alternatively, it is possible that a coil head comprises only a circumferentially bent portion or one or more radially and/or one or more circumferentially bent portions that form at least a part of the coil head portion of the stator coil.

In an embodiment, the electrical machine comprises a rotor with at least one magnetic flux generation means, wherein the magnetic flux generation means overlaps the extension segments at least partly in an axial direction of the electric machine. Depending on the type of the electrical machine, the magnetic flux generation means may be a permanent magnet, a rotor coil or a rotor pole. The rotor is rotatable around an axis in the axial direction of the electrical machine.

By providing magnetic flux generation means that overlap with the extension segments of the stator, the magnetic field, or the magnetic flux, respectively, in and around the coil heads is increased. This further increases the effect of the efficiency enhancement obtained by the extension segments. It is possible that from both face sides of the stator, extension segments protrude into the coil heads, wherein also the magnetic flux generation means is overlapping the extension segments to both axial face sides of the stator.

In an embodiment, one of the extension segments protrudes from each of the stator teeth of the stator. Hence, the extension segments are arranged around the entire circumference of the stator, so that from each stator tooth one extension segment protrudes into an area surrounded by at least one straight section of one of the coil heads and/or by at least one radially and/or circumferentially bent portion of at least one of the coil heads.

The radial length of the extension segments may correspond to the radial length of the coil head portions and/or to the radial length of the stator teeth. In particular, the stator extension structure has a ring-shape with an inner diameter corresponding to the diameter of the stator core and an outer diameter corresponding to an outer diameter of the stator teeth, wherein the stator extension segments each span from the inner diameter to the outer diameter.

In an embodiment, each extension segment abuts at least one of the coil heads in axial and/or circumferential direction. Depending on the shape of the coil head, and hence depending on the winding scheme of the stator winding, the extension segments may abut the coil head in axial and/or circumferential direction.

The stator coils may comprise one or more electrical conductors which are wound around at least one of the stator teeth forming a stator coil of the stator winding. The stator coils may comprise one or more flat conductors stacked on top of each other forming a conductor comprising for instance a rectangular cross-section. It is also possible that the stator winding is formed from a plurality of conductors each comprising a circular cross-section. The individual conductors forming the stator coil and/or the entire assembly of conductors forming the stator coil may be coated with an insulating material. In this case, the extension segment may abut an insulating coating of the electrical conductors, or an electrically insulating sheath of the coil heads, respectively.

By directly abutting the coil heads at least section-wise, an airgap between the extension segment and the coil head may be avoided or at least reduced in size. This increases the magnetic coupling between the coil head and the extension segment. In particular, each of the coil heads is abutted by at least in certain areas by one or more of the extension segments.

A further advantage of the stator extension structure abutting the coil heads may be an improved cooling of the coil heads. It is possible that the stator core and/or the stator teeth comprise cooling channels and/or cooling ducts used for cooling the stator and also the stator windings. By extending the stator into the areas surrounded at least partly by one or more of the coil heads, the cooling of the coil heads may be improved since a heat flux from the coil heads into the cooling channels becomes possible.

In an embodiment, the stator coils are arranged forming a concentrated winding, wherein the extension segments are each protruding into the circumferentially bent portions of the coil heads. In a concentrated winding, each stator coil is wound around a stator tooth, so that the straight portions of the stator coil run through two adjacent slots to each side of the stator tooth. The coil head portion of each of the stator coils may have in particular a U-shape, wherein the extension segments protrude into the circumferentially bent portion of the coil head.

The extension segments may each have for instance a surface which corresponds to the shape, or the radius, respectively, of the circumferentially bent portion of the coil head to maximize a contact area between the coil head and the extension segment abutting the coil head in axial and/or circumferential direction.

Alternatively, the stator coils may be arranged forming a distributed winding, wherein the coil heads are arranged at least partially overlapping at least one neighboring coil head, wherein the extension segments each protrude in between two neighboring coil heads. Hence, an extension segment may protrude in between two neighboring coil heads that are at least partially overlapping or in between two neighboring coil heads that are not overlapping, because these coil heads each overlap at least one further neighboring coil head.

In a distributed winding, two or more coil heads of adjacently arranged stator coils may overlap. The coil heads of these stator coils may be bent in circumferential and/or radial direction depending on the windings scheme of the entire stator winding, the number of phases and/or the geometry of the conductors forming the stator coils. At least a part of the extension segments may therefore protrude into an area which is surrounded by more than one radially and/or circumferentially bent portion of multiple coil heads.

In an embodiment, the extension structure comprises one or more connection portions, which each connect at least two neighboring extension segments and which each abut one of the coil heads. In particular, the connection portions of the extension structure may each abut a portion of a coil head. The connection portions may provide additional mechanical stability to the coil heads. For example, the extension structure may be a comb structure or a multi-fin structure or the like comprising a connection portion that forms a base segment from which the plurality of extension segments protrudes.

In an electrical machine with a concentrated winding, the connection portion may span for instance in the axial direction and in the circumferential direction, wherein the extension segments protrude in axial direction into the coil heads. In an electrical machine with a distributed winding, the connection portions may each span for instance in circumferential and in radial direction. In particular, the connection portion may axially abut one or more of the stator coils. The connection portions may comprise or consist of the same material as the extension segments.

Therefore, also the connection portions may be soft magnetic and/or comprise a permeability higher than air so that they are able to guide a magnetic field, or a magnetic flux, respectively.

Furthermore, the connection portions may increase the mechanical stability of the coil heads since they may be used for partially supporting the electrical conductor forming the coil heads.

This allows for reducing and/or omitting for instance a supporting material added as an insulating cover or the like to the electrical conductors.

In an embodiment, the stator extension structure is formed integrally with at least one of the stator teeth and/or with the stator core. The stator extension structure providing the extension segments protruding into the coil heads may be provided by the axial end sections of the stator. For example, the stator extension structure may be formed in the stator core or the stator teeth, respectively, by cutting and/or milling. It is also possible to use correspondingly shaped sheets of electrical steel stacked in axial direction for forming the stator with the extension structure.

Alternatively, it is possible that the stator extension structure is provided by at least one stator extension element attached to at least one of the stator teeth and/or to the stator core. A stator extension element may form one or more of the extension segments. In particular, one or more stator extension elements are arranged around the entire circumference of the stator core.

By providing the extension structure as one or more separate extension elements, the fabrication of the electrical machine may be facilitated, regarding large electrical machines used for instance in wind turbines. This facilitates the fabrication of extension segments with a complex geometry, which may be used together with already existing concentrated or distributed winding designs with minimum design changes. The stator extension element may be arranged on the stator prior to or after the arrangement of the stator windings, depending on the geometry of the stator extension element and/or of the geometry of the coil heads.

In an embodiment, the stator extension element is fabricated by additive manufacturing and/or comprises or is made of a soft magnetic composite material and/or one or more laminations of electrical steel. By using a soft magnetic composite (SMC) material, also complex three-dimensional structures may be fabricated easily reducing the effort of the fabrication of the stator extension structure, or the electrical machine, respectively. A complex three-dimensional structure of the stator extension element may be obtained by fabricating the extension element using additive manufacturing like three-dimensional printing.

It is also possible to form the stator extension element and hence the stator extension structure from one or more laminations of electrical steel and afterwards attaching it to an axial end of the stator for providing the extension segments. A stator extension element made from a material comprising a plurality of electrically insulated particles, like a SMC material, and/or a plurality of electrically insulated laminations reduces the eddy currents induced in the stator extension element, in the stator extension segments, and therefore increases the efficiency of the electrical machine.

In an embodiment, the stator extension element is attached to the stator teeth and/or the stator core by a bolted connection, a glued connection, a form-fit connection, a welded connection, and/or by one or more intermediate elements arranged in between the stator extension element and the stator teeth and/or the stator core.

Also, combinations of different connection types are possible, for instance a bolted connection may be combined with a glued connection. A form-fit connection may be provided by a dove-tail structure of the stator extension element and the stator teeth, or the stator core, respectively, so that also stator extension elements that cannot be welded, glued and/or bolted may be attached. It is also possible that one or more intermediate elements are arranged between the stator extension element and the stator teeth, or the stator core, respectively, to facilitate the attachment of the stator extension element. By using one or more intermediate elements, for instance a welding and/or gluing of the stator extension element to the intermediate element and as well as a gluing and/or welding of the intermediate element to the stator teeth and/or the stator core becomes possible, when a direct welding of the material of the stator extension element to the material of the stator teeth, or the stator core, respectively, is not possible.

A stator extension element for an electrical machine according to embodiments of the invention comprises at least one connection portion and at least two magnetic flux-guiding stator extension segments protruding from the connection portion, wherein the stator extension element is adapted to be attached to at least one of the stator teeth and/or to the stator core in such manner that the extension segments each protrude axially from a stator tooth of the electrical machine into an area surrounded by at least one of the coil heads of the electrical machine.

In an embodiment, the stator extension element is fabricated by additive manufacturing and/or comprises a soft magnetic composite material and/or one or more laminations of electrical steel.

All details and advantages described in relation to the electrical machine apply correspondingly to the stator extension element and vice versa.

A wind turbine according to embodiments of the invention comprises at least one electrical machine. The electrical machine is used as a main generator of the wind turbine, hence as generator which is driven by the rotor blades of the wind turbine.

All details and advantages described in relation to the electrical machine and the stator extension element apply correspondingly to the wind turbine and vice versa.

BRIEF DESCRIPTION

Some of the embodiments will be described in detail, with reference to the following figures, wherein like designations denote like members, wherein.

DETAILED DESCRIPTION

Figure 1:
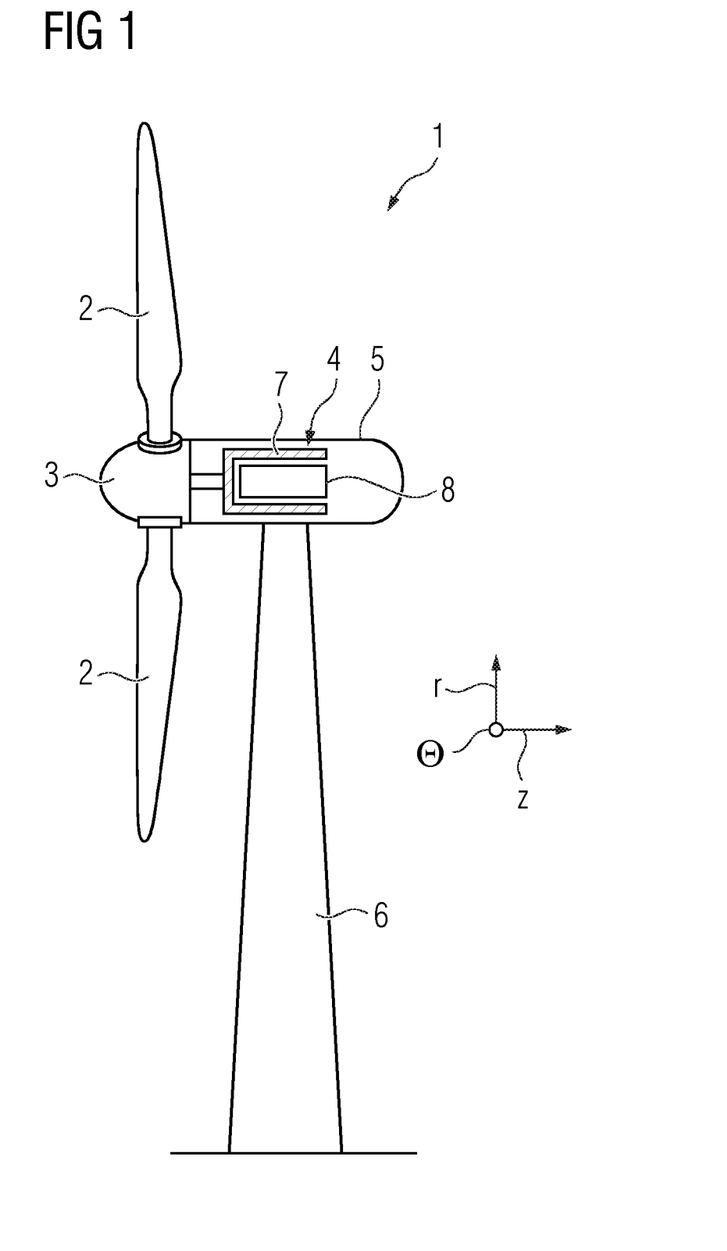
FIG. 1 shows an embodiment of a wind turbine.

In FIG. 1, an embodiment of a wind turbine 1 is shown. The wind turbine 1 comprises a plurality of rotor blades 2, which are attached to a hub 3 of the wind turbine 1. The rotor blades 2 at the hub 3 drive an electrical machine 4, which is operated as a generator for generating an electrical power during the operation of the wind turbine 1. The electrical machine 4 is arranged inside a nacelle 5 of the wind turbine 1, wherein the nacelle 5 is arranged on a top of a tower 6 of the wind turbine 1.

The electrical machine 4 comprises a rotor 7 and a stator 8, wherein the electrical machine 4 exhibits an inner stator-outer rotor configuration. However, it is also possible that the electrical machine 4 has an outer stator-inner rotor configuration instead.

Figure 2:
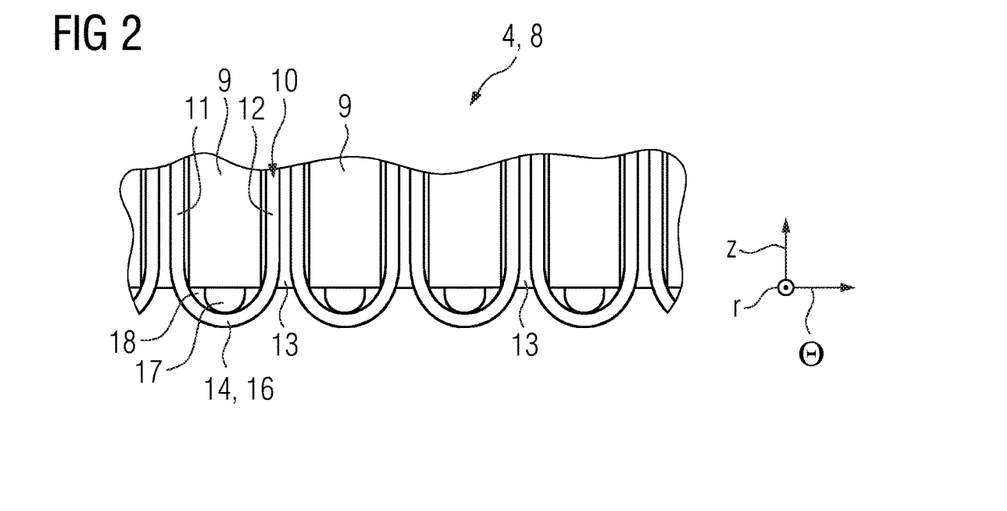
FIG. 2 shows a first embodiment of an electrical machine.

In FIG. 2, a first embodiment of an electrical machine 4 is shown. The electrical machine 4 is a rotary electrical machine with a cylindrically shaped stator 8. For the sake of clarity, only a section of the electrical machine 4 is depicted.

The stator 8 of the electrical machine 4 comprises a plurality of stator teeth 9 each carrying a stator coil 10 of a stator winding of the electrical machine 4. The stator coils 10 of the stator winding are wound as a concentrated winding so that each of the stator coils 10 is supported by one of the stator teeth 9.

Each of the stator coils 10 comprises two straight sections 11, 12 which are each arranged in a slot 13 between two adjacent stator teeth 9. The straight sections 11, 12 are arranged in the axial direction z of the electrical machine. The stator teeth 9 and the stator coils 10 are arranged in circumferential direction Θ around the outer circumference of the stator 8 and therefore adjacently to an air gap formed in between the stator 8 and the rotor 7.

Each of the stator coils 10 comprises a coil head 14 that protrudes from an axial end section 15 of the stator 8 in the axial direction z in this embodiment, the coil head 14 comprises a circumferentially bent section 16, which connects the two straight sections 11, 12 of the stator coil 10 arranged in the slots 13 between the stator teeth 9.

The stator 8 comprises a stator extension structure 20 with a plurality of stator extension segments 17. The stator extension segments 17 each protrude from one of the stator teeth 9 in axial direction z. The extension segments 17 each project at least partly into an area 18, which is surrounded by the circumferentially bent portion 16 of one of the coil heads 14. To obtain a symmetric geometry of the stator 8 and an electrically symmetric behaviour of the electrical machine 4, there is one extension segment 16 protruding from each of the stator teeth 9 of the stator 8 so that the stator extension segments 17 are arranged around the entire circumference of the stator 8.

Like the stator 8, the stator extension segments 17 may comprise or consist of a soft magnetic material improving the guiding of the magnetic flux in the area of the coil heads 14. This allows for using the coil heads 14 as an active portion of the stator winding of the stator 8.

The extension segments 17 are each abutting one of the stator coils 14 in axial direction z. The extension segments 17 each have an abutting surface which corresponds to the shape, or the radius, respectively, of the circumferentially bent portion 16 of the coil head 14 to maximize the contact area between the coil head 14 and the extension segment 17 abutting the coil head 14 in axial direction.

By using the extension segments 17, the effective volume of the stator 8 may be increased into the areas 18, which are surrounded by the circumferentially bent portions 16 of the coil heads 14. This allows for generating induced electromotive force and torque also in the area of the coil heads 14. To further increase this effect, the rotor 7 of the electrical machine 4 comprises a plurality of magnetic flux generation means, which overlap the extension segments at least partly in the axial direction z of the electric machine 4. The magnetic flux generation means may be for instance permanent magnets, rotor coils or a rotor poles, depending on the type of the electrical machine 4.

Figure 3:
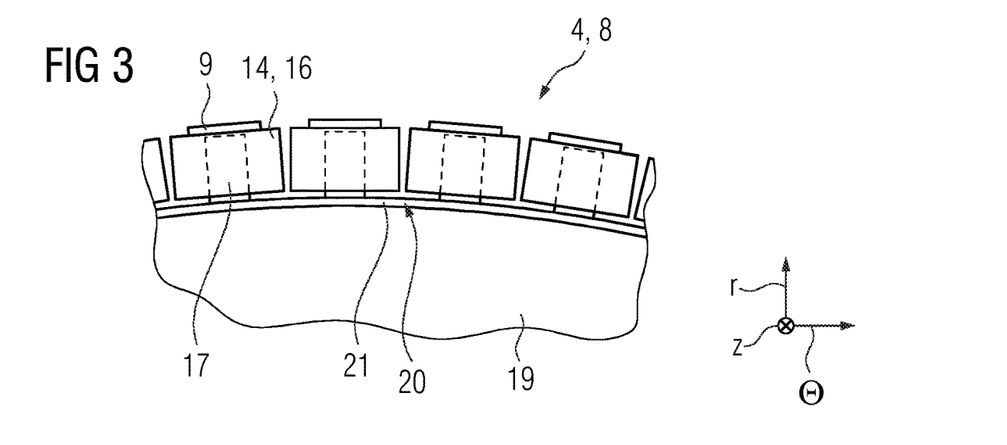
FIG. 3 shows a second view of the first embodiment of the electrical machine.

In FIG. 3, a front face view of the first embodiment of the electrical machine 4 is shown depicting a stator core 19 of the stator 8. The stator core 19 supports the stator teeth 9. The stator extension segments 17 of the stator extension structure 20 are shown partly in dashed lines where they are overlapped by the coil heads 14.

The stator extension structure 20 is arranged around the entire circumference of the stator 8 and comprises the stator extension segments 17 as well a connection portion 21 connecting the plurality of stator extension segments 17. The connection portion 21 extends mainly in circumferential direction Θ as well as in axial direction 7 and connects the plurality of stator extension segments 17.

The connection portion 21 shown in a distance to the coil heads 14 for showing that the stator extension segments 17 protrude towards the circumferentially bent portions 16 of the coil heads 14. It is however possible that stator extension structure 20 is shaped in such manner that the connection portion 21 directly abuts the coil heads 14 in radial direction r. In an inner-rotor outer-stator configuration of the electrical machine 4, it is also possible that the stator extension structure 20 is placed in radial outward direction instead.

The radial length of the stator extension segments 17 is in particular at least equal to the radial length of the coil heads 14, hence the width in radial direction r of the electrical conductors forming the stator coils 10. The stator extension structure 20 comprises a ring shape, wherein the inner radius of the ring corresponds to the radius of the stator core minus the radial thickness of the connection portion 21. The outer radius of the stator extension structure 20 may correspond so the outer radius of the stator teeth 9 so that the stator extension structure 20 is as close to the air gap between the stator 8 and the rotor 7 as the stator teeth 9. The stator extension structure 20 protrudes in axial direction z beyond the stator core 19, beyond one of the end faces of the stator core 19 extending perpendicular to the axial direction z, or in the re-plane, respectively.

Figure 4:
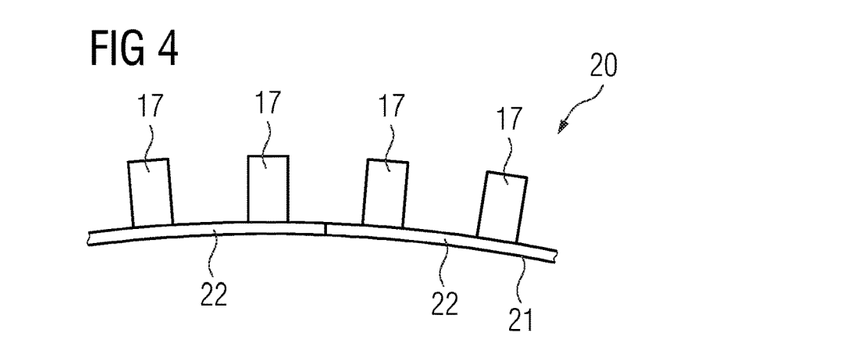
FIG. 4 shows a detailed view on the stator extension structure of the first embodiment of the electrical machine comprising a first embodiment of a stator extension element.

In FIG. 4, a detailed view of the stator extension structure 20 is shown. The stator extension structure 20 comprises a comb structure may be formed integrally with the stator teeth 9 and/or the stator core 19. The stator extension structure 20 may be formed for instance by milling and/or cutting it into one or both face sides of the stator 8. It is also possible that correspondingly shaped sheets of electrical steel are stacked in axial direction z of the electrical machine 4 to form the entire stator 8 including the stator teeth 9, the extension structure 20 and the stator core 19.

Besides an integral formation of the stator extension structure 20 as part of the stator teeth 9 and/or the stator core 19, it is also possible that the stator extension structure 20 is provided as a separate stator extension element 22, which is attached to the stator teeth 9 and/or the stator core 19. It is possible that the stator extension structure 20 is firmed by a plurality of stator extension elements 22 which are arranged adjacently to each other in circumferential direction Θ. This is indicated in FIG. 4 by the two first embodiments of a stator extension element 22, which are arranged abutting each other.

The stator extension elements 22 each comprise a connection portion 21 and a plurality of magnetic flux-guiding stator extension structures 17, which protrude in radial direction r from the connection portion 21. The usage of a plurality of stator extension elements 22 facilitates the installation of the stator extension structure 20 and/or the installation of an electrical machine 4, of an electrical machine 4 used as part of a wind turbine 1.

Figure 5:
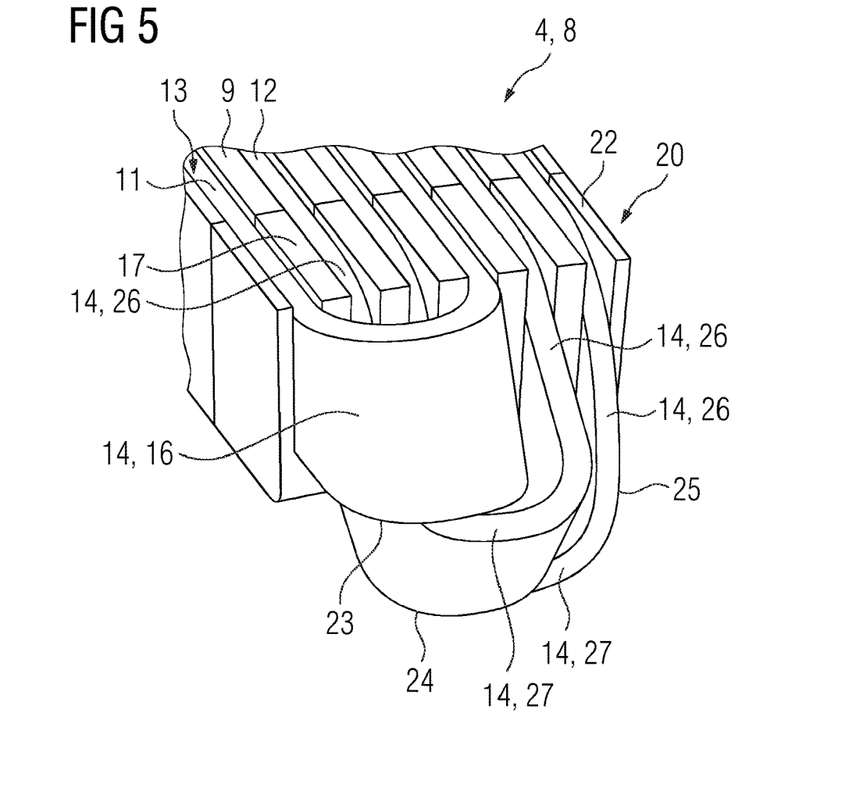
FIG. 5 shows a second embodiment of an electrical machine.

In FIG. 5, a second embodiment of an electrical machine 4 is shown. For the sake of clarity, only a small portion of an axial end section 15 of the stator 8 is shown. In this embodiment, the stator winding is provided as a three-phase distributed winding pattern, in which three stator coils 23, 24, 25 are arranged at least partly overlapping in the slots 13 between the stator teeth 9. The stator coils 23, 24 and 25 may for instance each contribute to one of three phases of the stator winding of the electrical machine 4. The entire stator winding is formed by a plurality of the depicted patterns, which are arranged circumferentially adjacent to each other around the outer circumference of the stator 8.

Each of the stator coils 23, 24 and 25 comprise two straight sections 11 and 12 arranged in the slots 13 between a pair of stator teeth 9. From each of the stator teeth 9, a stator extension segment 17 protrudes in axial direction x of the electrical machine 4. Each of the stator coils 23, 24, 25 comprises a coil head 14. The coil head 14 of the coil 23 comprises a circumferentially bent section 16 overlapping with both the coil 24 and the coil 25. The coil 24 comprises a coil head 14 with two radially bent portion 26 and one bent portion 27, which is bent both in radial direction r and in circumferential direction Θ. The third stator coil 25 comprises also two radially bent portions 26 and one bent portion 27 that is bent both in radial direction r and in circumferential direction Θ.

Figure 6:
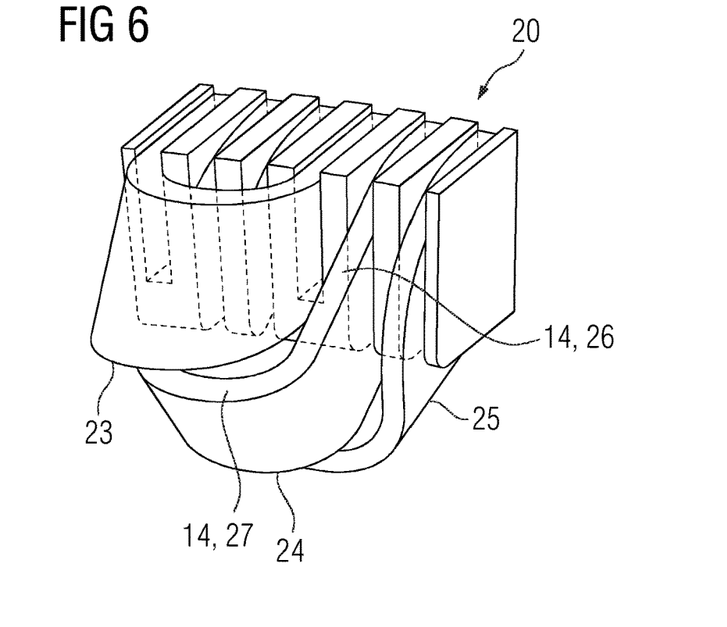
FIG. 6 shows a second view on the second embodiment of the electrical machine.

Each of the stator extension segments 17 protrudes in axial direction z from a stator tooth 9 into an area 18 which is surrounded by the radially bent portions 26 and/or by the radially and circumferentially bent portion 27 of at least one of these coil heads 14. Each of the stator extension segments 17 is protruding in between two neighboring of the coil heads 14 of the depicted stator coils 23, 24 or 25 and/or of further coils 23 or 25 arranged adjacently in circumferential direction Θ. This is also visible from FIG. 6, in which the coils 23, 24 and 25 are shown transparently and under a different viewing angle.

Figure 7:
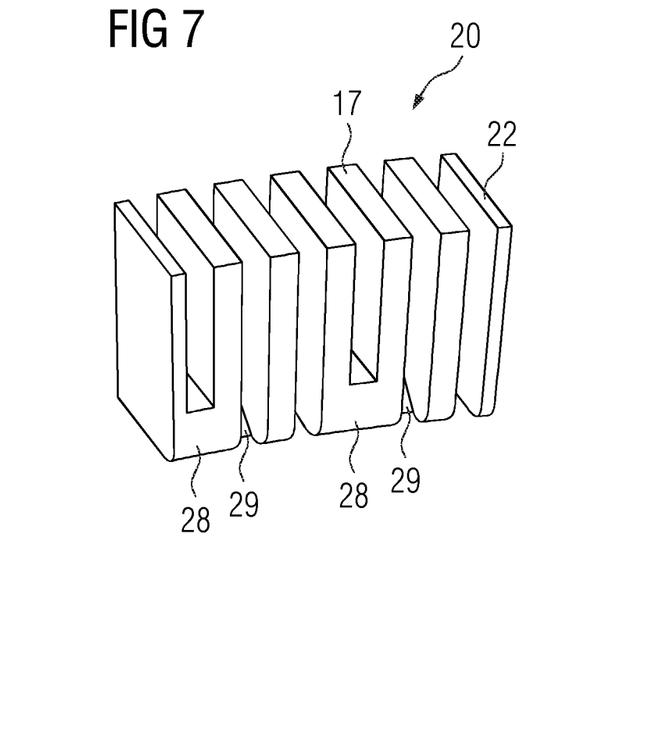
FIG. 7 shows a detailed view on the stator extension structure of the second embodiment of the electrical machine comprising a second embodiment of a stator extension element.

In FIG. 7, a second embodiment of a stator extension element 22 is shown. The stator extension structure 20 of the second embodiment of the electrical machine 4 may be formed for instance by a plurality of stator extension elements 22 as depicted. The stator extension segments 17 at the circumferential ends of the stator extension element 22 have only half the width in circumferential direction Θ than the remainder of the stator extension segments 17. This allows for arranging a plurality of the stator extension elements 22 adjacently to each other in circumferential direction around the stator 8 of the electrical machine 4.

The stator extension structure 20 comprises a plurality of connection portions 28, 29, which connect the stator extension segments 17 in circumferential direction Θ. The first connection portions 28 are straight in axial direction x and abut the stator coil 23 in radial direction supporting the stator coil 23. The second connection portions 29 are tilted in radially inward direction so that they abut the radially bent sections 26 of the stator coil 24. The width of the connection portions 28, 29 in circumferential direction Θ is at least substantially equal to the width in circumferential direction Θ of the conductors forming the stator coils 10. Correspondingly, the length of the extension structures 17 in radial direction r is at least substantially equal to the radial length of the conductors forming the stator coils 10.

Figure 8:
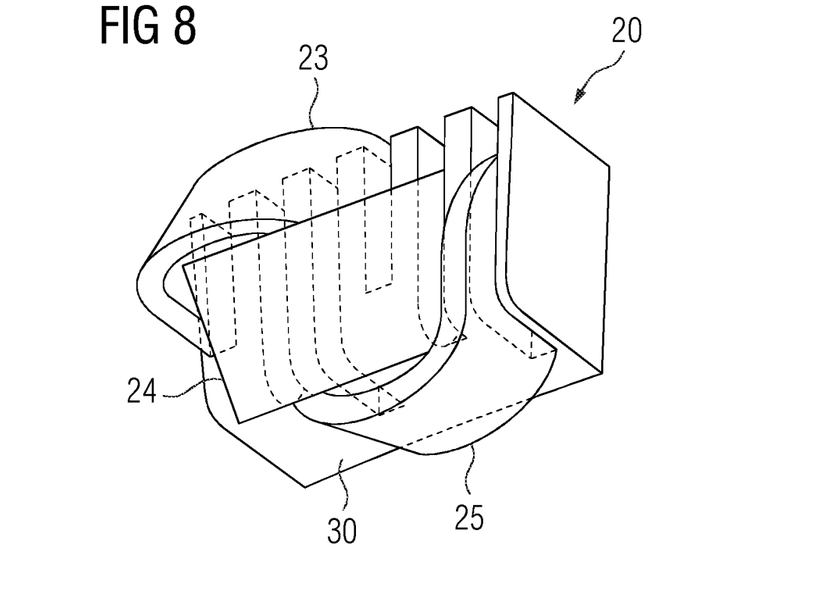
FIG. 8 shows a third view on the second embodiment of an electrical machine.

As can be seen from FIG. 8, the stator extension structure 20 comprises a further connection portion 30 which is arranged at the radially inward side of the stator extension element 22. The connection portion 30 abuts the radially inward bent sections 26 of the stator coil 25.

The stator extension elements 22 in the first embodiment and/or in the second embodiment of the electrical machine 4 may be attached to the stator teeth 9 and/or the stator core 19 by a bolted connection, a glued connection, a form-fit connection, a welded connection, and/or by one or more intermediate elements arranged in between the stator extension element 22 and the stator teeth 9 and/or the stator core 19. The type of the connection used for attaching the stator extension elements 22 to the stator teeth 9 and/or the stator core 19 may be chosen depending on the material of the stator teeth 9, or the stator core 19, respectively, as well as depending on the material forming the stator extension elements 22.

The stator extension elements 22 may comprise or consist of a soft magnetic composite (SMC) material which facilitates the fabrication of the three-dimensional structure of the stator extension structure 20. It is also possible that the stator extension elements 22 are fabricated from one or more laminations of electrical steel, which are stacked together in axial direction of the electrical machine for forming the stator extension structure 20, or the stator extension element 22, respectively. The stator extension elements 22 may be fabricated by additive manufacturing like 3D-printing. This facilitates the generation of complex three-dimensional structures and allows for using the stator extension elements 22 also with complex winding schemes, or complex coil head geometries, respectively.

The stator extension elements 22 may be bolted to the stator teeth 9 and/or the stator core 19 it is also possible that a combination of a bolted connection and a glued connection or the like is used. Furthermore, it is possible that a form-fit connection, like a dove-tail connection is used, wherein the stator extension element 22 and the stator teeth 9 and/or the stator core 19 exhibit each a corresponding dove-tail structure enabling a form-fit connection. Depending on the material of the stator extension elements 22, also a welded connection may be used. For facilitating the gluing and/or the welding of the stator extension elements 22 to the stator teeth 9 and/or the stator core 19, one or more intermediate elements (not depicted) may be arranged in between the stator extension elements 22 and the stator teeth 9 and/or the stator core 19.

It is possible that the stator 8 comprises one or more cooling channels arranged inside the stator teeth 9 and/or the stator core 19. By providing the stator extension structure 20 as described in relation to the embodiments, also a cooling of the coil heads 14 may be improved since a heat flux from the coil heads 14 into the stator 8 and therefore also into the cooling channel is increased.

In all embodiments, the stator coils 10 may be formed from a plurality of stacked flat band-conductors. Also, a fabrication of the stator coils 10 from a plurality of circular conductors like wires is possible. The outer circumference of the stator coils 10 and/or the outer circumference of the coil heads 14 may be coated with an electrically insulating material. Due to the additional mechanical support provided by the stator extension structure 20, the insulating material may be omitted or provided with a reduced thickness.

In all embodiments, it is possible that the stator 8 of the electrical machine 4 comprises a stator extension structure 20 on both the axial end of the stator 8, hence on both the end directed towards the hub 3 of the wind turbine 1 and the opposing end, respectively.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An electrical machine comprising:
    a stator with a stator core, a plurality of stator teeth protruding radially from the stator core, and a plurality of stator coils, wherein each stator coil is wound around at least one stator tooth of the stator, and comprises a first straight section arranged in a first slot and a second straight section arranged in a second slot, wherein a single stator tooth is disposed between the first slot and the second slot;
    at least one coil head protruding in an axial direction beyond the stator core, the at least one coil head comprising a bent section that connects the first straight section and the second straight section; and
    a stator extension structure with a plurality of magnetic flux-guiding extension segments each protruding axially from a stator tooth into an area defined between the bent section and the single stator tooth;
    a rotor with at least one magnetic flux generation means, wherein the magnetic flux generation means overlaps the extension segments at least partly in an axial direction of the electric machine;
    wherein each extension segment abuts the bent section of the at least one coil head in an axial direction and/or a circumferential direction.

2. The electrical machine according to claim 1, wherein at least some of the plurality of magnetic flux-guiding extension segments extend at least partly into an area which is surrounded by a radially and/or circumferentially bent portion of at least one coil head.

3. The electrical machine according to claim 1, wherein one of the extension segments protrudes from each of the stator teeth of the stator.

4. The electrical machine according to claim 1, wherein the stator coils are arranged forming a concentrated winding, wherein the extension segments are each protruding into circumferentially bent portions of the at least one coil head.

5. The electrical machine according to claim 1, wherein the extension structure comprises one or more connection portions, which each connect at least two neighboring extension segments and which each abut one coil head.

6. The electrical machine according to claim 1, wherein the stator extension structure is formed integrally with at least one of the stator teeth and/or the stator core.

7. The electrical machine according to claim 1, wherein the stator extension structure is provided by at least one stator extension element attached to at least one of the stator teeth and/or to the stator core.

8. The electrical machine according to claim 6, wherein the stator extension element is fabricated by additive manufacturing and/or comprises a soft magnetic composite material and/or one or more laminations of electrical steel.

9. The electrical machine according to claim 7, wherein the stator extension element is attached to the stator teeth and/or the stator core by a bolted connection, a glued connection, a form-fit connection, a welded connection, and/or by one or more intermediate elements arranged in between the stator extension element) and the stator teeth and/or the stator core.

10. A stator extension element for an electrical machine according to claim 7, wherein the stator extension element comprises at least one connection portion and at least two magnetic flux-guiding stator extension segments protruding from the connection portion, wherein the stator extension element is configured to be attached to at least one of the stator teeth and/or to the stator core in such manner that the extension segments each protrude axially from a stator tooth of the electrical machine into an area surrounded by at least one of the coil heads of the electrical machine.

11. The stator extension element according to claim 10, wherein the stator extension element is fabricated by additive manufacturing and/or comprises a soft magnetic composite material and/or one or more laminations of electrical steel.

12. A wind turbine comprising at least one electrical machine according to claim 1 and/or at least one stator extension element.

13. The electrical machine according to claim 1, wherein the plurality of magnetic flux-guiding extension segments each have an abutting surface which corresponds to a shape or a radius of a bent portion of the coil head.

14. An electrical machine comprising: a stator with a stator core, a plurality of stator teeth protruding radially from the stator core, and a plurality of stator coils, wherein each stator coil is wound around at least one stator tooth of the stator; at least three coil heads arranged at least party overlapping in slots between the plurality of stator teeth, the at least three coil heads protruding in an axial direction beyond the stator core, each coil head comprising two straight sections arranged in slots between the plurality of stator teeth, wherein a first coil head comprises a circumferentially bent section connecting the two straight sections and overlapping a second coil head and a third coil head, the second coil head comprising two radially bent portions and one bent portion that is bent in both a radial and a circumferential direction, and connects the two straight sections, the third coil head comprising two radially bent portions and one bent portion that is bent in both a radial and a circumferential direction, and connects the two straight sections; and a stator extension structure with a plurality of magnetic flux-guiding extension segments each protruding axially from a stator tooth into an area surrounded by the at least one coil head, wherein the stator extension structure includes a first connection portion that is tilted in a radially inward direction to abut the radially bent portions of the second coil head, and a second connection portion arranged at a radially inward side of the stator extension structure that abuts the radially bent sections of the third coil head; a rotor with at least one magnetic flux generation means, wherein the magnetic flux generation means overlaps the extension segments at least partly in an axial direction of the electric machine; wherein the stator coils are arranged forming a distributed winding, further wherein the extension segments each protrude in between two neighbouring coil heads.

15. The electrical machine of claim 14, wherein the first coil head, the second coil head, and the third coil head each have a different shape.

16. The electrical machine of claim 14, wherein the first coil head, the second coil head, and the third coil head each protrude a different distance from the stator core.

* * * * *